United States Patent

[11] 3,592,397

| [72] | Inventor | William H. Mathys<br>Oak Hill, W. Va. |
|---|---|---|
| [21] | Appl. No. | 843,057 |
| [22] | Filed | July 18, 1969 |
| [45] | Patented | July 13, 1971 |
| [73] | Assignee | The Marmon Group, Inc.<br>Chicago, Ill. |

[54] BREAKER CONVEYORS
7 Claims, 2 Drawing Figs.

[52] U.S. Cl. .................................................. 241/187, 241/200
[51] Int. Cl. .................................................. B02c 13/06, B02c 13/286
[50] Field of Search .......................................... 241/186, 187, 200

[56] References Cited
UNITED STATES PATENTS

| 2,005,758 | 6/1935 | Shiley | 241/200 X |
| 2,464,774 | 3/1949 | Keiper | 241/200 X |
| 3,016,204 | 1/1962 | Long | 241/200 |
| 3,103,163 | 9/1963 | Gates | 241/200 X |

FOREIGN PATENTS

| 681,200 | 10/1952 | Great Britain | 241/187 |

*Primary Examiner*—Donald G. Kelly
*Attorney*—Rommel and Rommel

ABSTRACT: A breaker-type conveyor including a plurality of conveyor elements and wherein breaker bars are provided to each side of the conveyor elements in position to relieve breaking loads on the conveyor elements.

PATENTED JUL 13 1971  3,592,397
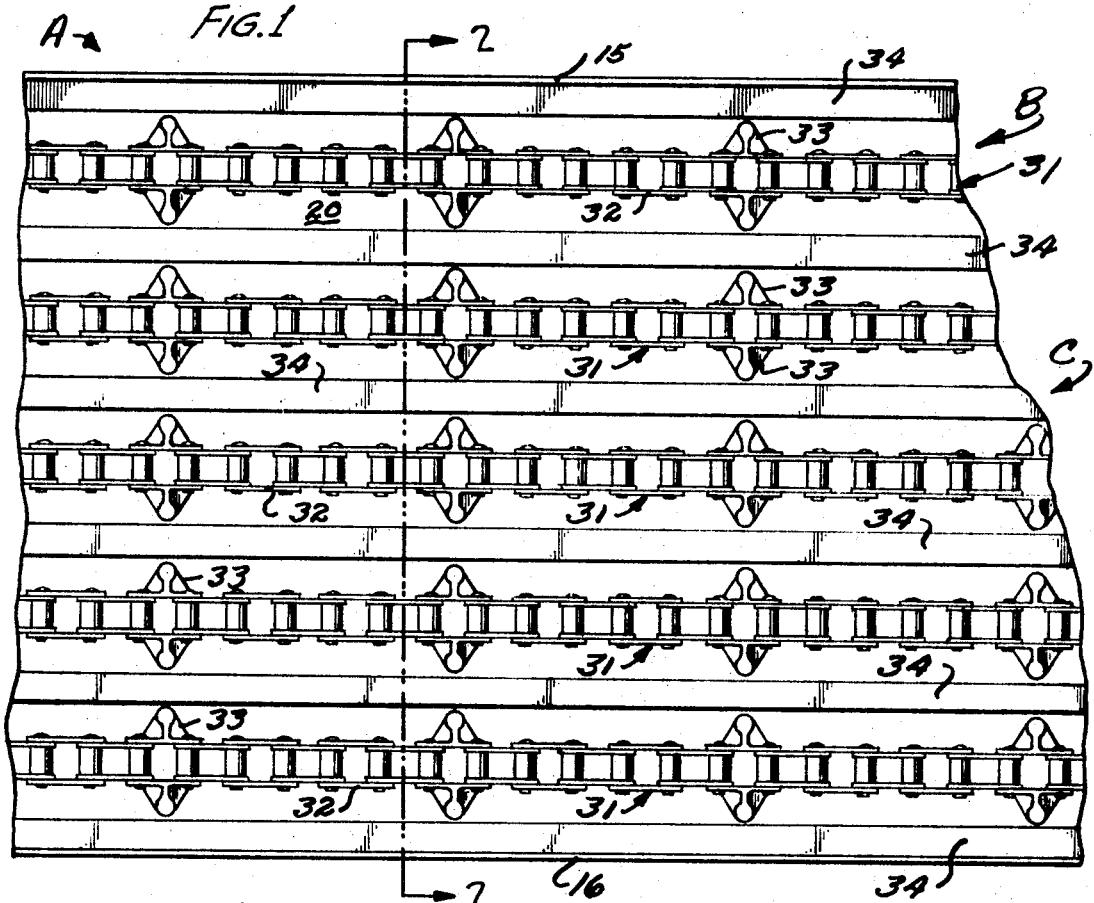
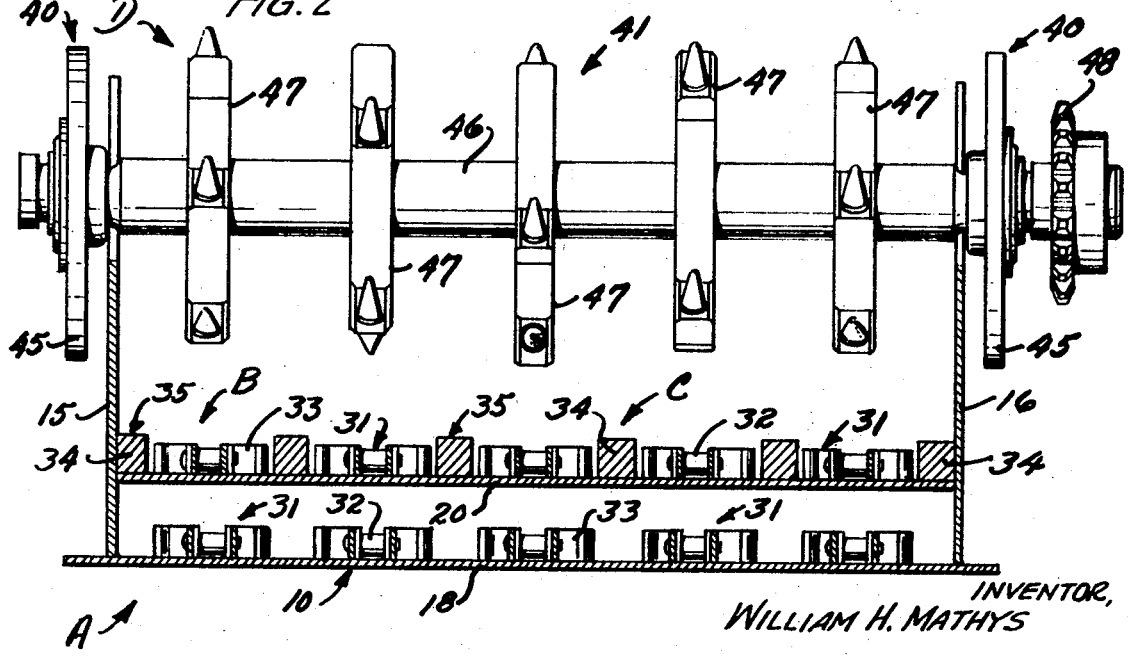
INVENTOR,
WILLIAM H. MATHYS
BY Rommel and Rommel
ATTORNEYS

BREAKER CONVEYORS

This invention relates to improvements in breaker conveyors of the general type as shown in U.S. Pat. No. 3,016,204, dated Jan. 9, 1962. In this type of conveyor, a load is moved from the loading end thereof to the discharge end thereof by conveying elements, load-processing means being disposed intermediate the loading end and discharge end for reducing the size of material being conveyed. In this type of breaker conveyor, particularly when breaking hard material, considerable pressure is exerted between the load-processing means and the conveyor elements. In the case when chain and flight conveyors are used for the conveyor elements, this has sometimes caused damage to the chain or bending of the flights. The situation has sought to be alleviated through use of a plurality of conveyor elements, but this has not proven particularly effective. The primary object of this invention is the provision of anvil means adjacent the conveyor elements which has a surface more closely adjacent the load processing means than the conveyor elements in order to relieve breaking loads on the conveyor elements.

A further object of the invention is the provision of a breaker conveyor having a plurality of endless conveyor elements and wherein breaker bars are disposed to each side of each endless conveyor element and extend for substantially the entire conveying reach of the conveyor, such breaker bars providing a means for relieving breaking loads on the endless conveyor elements and also serving to ratio the feed of material through the conveyor.

Other objects and advantages of the invention will be apparent during the course of the following detailed description, taken in connection with the accompanying drawing, forming a portion of this specification and in which drawing:

FIG. 1 is a top plan view of a portion of the conveying reach of the breaker conveyor.

FIG. 2 is an enlarged fragmentary sectional view taken substantially on the line 2-2 of FIG. 1.

Since the present invention may be installed in a conveyor of the type as disclosed in the aforementioned U.S. Pat. No. 3,016,204, it has not been deemed necessary to provide a detailed showing and description of the overall conveyor characteristics, the same being readily understood by reference to U.S. Pat. No. 3,016,204.

In the drawing, wherein for the purpose of illustration is shown a preferred embodiment of the invention, an wherein similar reference characters designated corresponding parts throughout the several views, the letter A may generally designate a breaker conveyor which may be of the type as shown in U.S. Pat. No. 3,016,204; B, conveying means which may be provided upon conveyor A; C, anvil means which may be provided upon conveyor A; and D, load-processing means thereof.

As may be readily understood by reference to U.S. Pat. No. 3,016,204, conveyor A may include a main frame 10, having sides 15 and 16, a bottom plate 18 which may support the return reach of conveying means B and a supporting plate 20 which may support the conveying reach of conveying means B and anvil means C.

Conveying means B preferably includes a plurality of conveying elements 31 which may be of the chain and flight type, each including a chain 32 having a plurality of flights 33.

Anvil means C preferably include a plurality of spaced breaker bars 34 having slots 35 therebetween within which may be received conveying elements 31. Breaker bars 34 may extend for substantially the entire length of the conveying reach of the conveyor A, or may be provided merely adjacent load-processing means D. When breaker bars 34 are provided along substantially the entire length of conveyor A, they serve to cooperate with conveying elements 31 to help ratio the feed of material along the conveyor. As shown in FIG. 2, breaker bars 34 preferably have an upper surface 35 which extends above the upper surface of conveying elements 31 to relieve the breaking loads on the endless conveying elements such as may be exerted by load-processing means D as it breaks material moving along conveyor A.

Load processing means D, as shown, is of the type as shown in U.S. Pat. No. 3,016,204, the same including a height-regulating frame means 40 and load-shattering means 41. Frame means 92 may include sideplates 45 which rotatably support load-shattering means 41. Load-shattering means 41 may include a shaft 46 having a plurality of picks 47. Shaft 46 and picks 47 mounted thereon may be rotated by a conventional drive means, through engagement with sprocket 48.

As described, it will be readily apparent that a load moving along the conveyor will be conveyed into a position where load-shattering means 41 will rotatably engage chunks of material being conveyed thereon in reducing the size of material passing therealong to a predetermined maximum size.

Various changes may be made to the form of the invention herein shown and described without departing from the spirit of the invention.

I claim:

1. In a conveyor having a frame, a loading end and a discharge end, conveying means mounted on said frame for moving a load from said loading end to said discharge end, said conveying means including a plurality of endless conveyor elements, and load-shattering means mounted on said frame for breaking the large individual pieces of a load upon said conveyor into relatively smaller pieces as the load is moved along said conveyor by said conveying means, the combination with said endless conveyor elements of anvil means mounted on said frame and disposed to each side of each endless conveyor element at at least the location where the same is adjacent said load-shattering means, said anvil means having a surface more closely adjacent said load-shattering means than said endless conveyor elements to relieve breaking loads on said endless conveyor elements.

2. A conveyor having a frame, loading end and discharge end, conveying means mounted on said frame for moving a load from said loading end to said discharge end, a supporting plate mounted on said frame for supporting the conveying reach of said conveying means, load-shattering means mounted on said frame for breaking the large individual pieces of a load upon said conveyor into relatively smaller pieces as the load is moved along said conveyor by said conveying means, said load-shattering means being positioned above and intermediate the length of said conveying means, breaker bar means mounted on said supporting plate and disposed to each side of said conveying means at at least the location where the same is adjacent said load-shattering means, said breaker bars having a surface more closely adjacent said load-shattering means than said conveying means to relieve breaking loads on said conveying means.

3. A conveyor as specified in claim 2 wherein said conveying means include a plurality of endless conveyor elements, said breaker bars being disposed to each side of each endless conveyor element.

4. A conveyor as specified in claim 3 wherein said breaker bars extend along substantially the entire length of the conveying reach of the conveyor.

5. A conveyor as specified in claim 3 wherein each said conveying elements comprises a chain and flight conveyor and wherein the flights thereof are relatively short.

6. A conveyor as specified in claim 2 wherein said load-shattering means comprises a plurality of rotating picks spaced apart from and disposed above said conveying means, said conveying means are positioned for moving material along said conveyor and beneath said picks, and wherein said breaker bars have a surface more closely adjacent said picks than said conveying means to relieve breaking loads on said conveying means.

7. A conveyor as specified in claim 2 wherein said breaker bars extend along substantially the entire length of the conveying reach of the conveyor.